July 9, 1968 B. LARKFELDT ET AL 3,391,756

DAMPER FOR REGULATING THE FLOW OF A GASEOUS MEDIUM

Filed Sept. 25, 1967

INVENTORS:
BIRGER LARKFELDT
JOEL ROSENBERG
BY
Howson & Howson
ATTYS.

ered July 9, 1968

3,391,756
DAMPER FOR REGULATING THE FLOW OF A GASEOUS MEDIUM

Birger Larkfeldt, Odensjo, Barnarp, and Joel Rosenberg, Jonkoping, Sweden, assignors to Aktiebolaget Svenska Flaktfabriken, Stockholm, Sweden
Continuation-in-part of application Ser. No. 582,793, Sept. 20, 1966. This application Sept. 25, 1967, Ser. No. 670,156
2 Claims. (Cl. 181—50)

ABSTRACT OF THE DISCLOSURE

A damper for regulating the gaseous flow in an air conditioning or ventilating duct comprising a regulating damper disk rotatably mounted in the duct. The sound generated by the damper is minimized by using perforated sheet metal material. The hole diameters of the perforations are within the range of 1.5 and 5.0 mm., and the sum of the areas of the holes is within the range of 15% and 60% of the total area of the damper.

---

This is a continuation-in-part of application Ser. No. 582,793 filed Sept. 20, 1966 and now abandoned.

The present invention relates to a damper for regulating the flow of a gaseous medium through an air conditioning or ventilating duct, which damper consists of a disk having the same outline as the cross section as said duct and mounted for turning movement therein to regulate the flow of gas therethrough.

Prior to the present invention, dampers of this type have been manufactured as solid dampers of sheet metal plate and have been provided with a coating of fabric to eliminate the noise generated by the gaseous flow past the regulating damper. Also, circular dampers of cloth having a rigid ring fastened thereto by sewing along the periphery, and provided with a single hole in the center have been used. In all cases, the level of sound generated by the gaseous flow past the regulating damper has been high, and repeated experiments have been made to decrease further the sound level.

With a damper according to the present invention, a low sound level is obtained in a simple and effective manner which has never before been possible to obtain with known dampers.

A damper according to the present invention is characterized by the provision of a rotatably mounted disk conforming in outline to the cross section of the duct and which is perforated. The diameters of the holes forming the perforations are within the limits of 1.5 to 5.0 mm., and the relationship between the sum of the areas of the different holes and the total area of the disk is within the limits of 15% to 60%. A damper of this character generates the lowest possible sound level when regulating the gaseous flow through the duct.

The invention will now be described with reference to the accompanying drawing showing an exemplifying embodiment of the invention, wherein.

Figure 1:
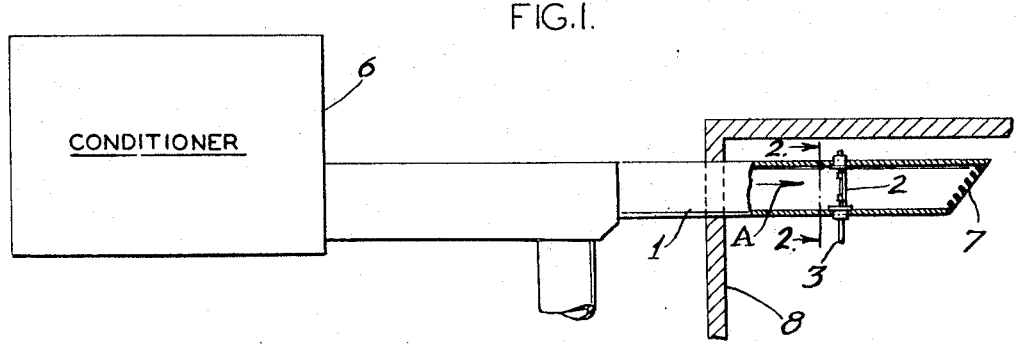
FIG. 1 is a diagrammatic view of a ventilating system having a circular duct provided with a regulating damper according to the invention.
Figure 2:
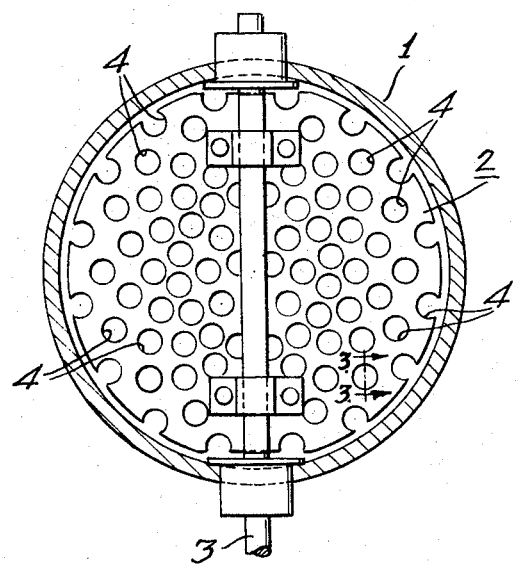
FIG. 2 is an enlarged transverse section through said duct taken on the line 2—2 of FIG. 1.
Figure 3:
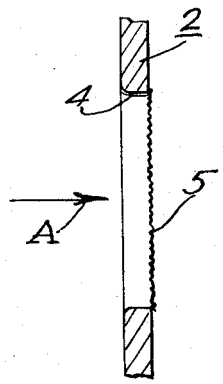
FIG. 3 is a further enlarged section taken on the line 3—3 of FIG. 2.

In the drawing, a ventilating system is shown in FIG. 1 including a conditioner 6, a ventilating opening 7 into a room 8, and circular duct 1 in which there is mounted a regulating damper 2 rotatably journalled in the duct by means of a stub shaft 3 to regulate the flow indicated in FIGS. 1 and 3 by the arrow A from the conditioner to the opening. The damper disk according to the invention comprises a perforated material characterized by a plurality of holes or perforations 4 distributed over the whole damper surface and having a diameter within the limits of 1.5 to 5.0 mm. The relationship between the sum of the areas of the different holes and the total area of the damper is within the limits of 15% to 60%.

If a regulating damper in an air conditioning or ventilation plant has a solid damper disk, an under-pressure area will appear behind said damper disk, in which area discontinuances occur, which results in disturbing sounds. This can be avoided, if, according to the invention, the damper disk is provided with a number of holes of the size and to the extent mentioned above. In this way, the under-pressure area will, to a certain extent, be filled with air from the holes in the damper disk and will be reduced so that no disturbing sounds arise.

The limits for the hole diameter and the perforation ratio are the values, within which the perforation is useful in order to reduce the sound generation. Tests have shown that the sound decreases with a decreasing hole diameter to a hole diameter between 1.5 and 2.0 mm., whereafter same increases rapidly and tends towards the value of a solid damper disk. On the other hand, if the hole diameter is made larged than 5 mm., the sound decrease is small in relation to the sound generated by a solid damper disk, and the holes may even give rise to new current sounds. In the same way as with the hole diameter, it has been found that a perforation area within the range of 15 to 60% of the disk area gives a useful sound decrease.

In order to generate the lowest possible sound level, if the disk is drilled or bored, the raw surfaces or burrs which are created when drilling the holes in the damper disk should be turned from the air current. In other words, as shown in FIG. 3, the burrs 5 of the disk should be on the downstream side of the damper.

The invention, of course, is not limited to a certain shape or diameter of the damper disk or a certain pattern of the perforations, but thesse may be chosen freely within the scope of the invention, as defined in the following claims.

We claim:

1. In a ventilating system having a conditioner, a ventilating opening into a room, and duct leading to said opening, a low sound-level damper for regulating the flow of a gaseous ventilating medium in the duct having a predetermined cross section comprising a single disk conforming in outline to said cross section, and means mounting said disk for rotation in said duct, said disk being perforated with holes having diameters within the limits of 1.5 to 5.0 mm., the relationship between the sum of the areas of the different holes and the total area of the disk being within the limits of 15% to 60%.

2. A low sound-level damper according to claim 1 wherein the holes forming the perforations impart a raw surface on one side of the disk, said one side being disposed on the downstream side of the damper.

References Cited

UNITED STATES PATENTS

| 1,735,789 | 11/1929 | Powell | 181—69 XR |
| 1,860,146 | 5/1932 | Gray | 181—45 |

FOREIGN PATENTS

| 327,933 | 4/1903 | France. |
| 598,629 | 10/1925 | France. |
| 1,044,850 | 6/1953 | France. |

ROBERT S. WARD, JR., *Primary Examiner.*